Figures 1, 2:
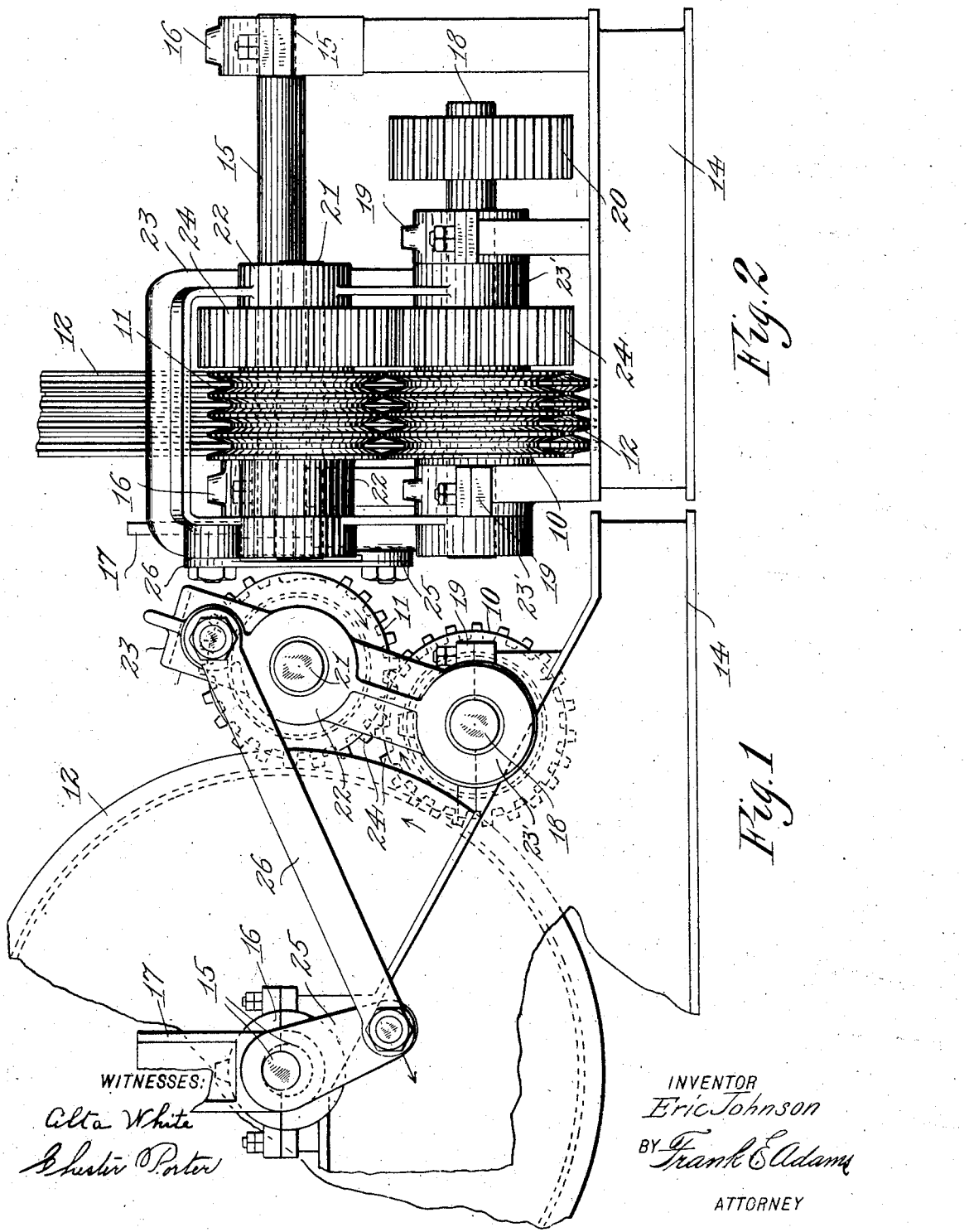

No. 761,839. PATENTED JUNE 7, 1904.
E. JOHNSON.
REVERSING MECHANISM.
APPLICATION FILED JUNE 17, 1903.
NO MODEL.

WITNESSES:
Alta White
Chester Porter

INVENTOR
Eric Johnson
BY Frank E Adams
ATTORNEY

No. 761,839.

Patented June 7, 1904.

UNITED STATES PATENT OFFICE.

ERIC JOHNSON, OF SEATTLE, WASHINGTON, ASSIGNOR TO SEATTLE MACHINE WORKS, OF SEATTLE, WASHINGTON, A CORPORATION.

REVERSING MECHANISM.

SPECIFICATION forming part of Letters Patent No. 761,839, dated June 7, 1904.

Application filed June 17, 1903. Serial No. 161,878. (No model.)

*To all whom it may concern:*

Be it known that I, ERIC JOHNSON, a citizen of the United States of America, and a resident of the city of Seattle, in the county of King and State of Washington, have invented certain new and useful Improvements in Reversing Mechanism, of which the following is a specification.

My invention relates to improvements in mechanism for reversing the motion of a driven wheel, and has special reference to apparatus of this class which is especially adapted to operate a take-up for hauling cables.

Among numerous objects attained by this invention and readily understood from the following specification and accompanying drawings, included as a part thereof, is the production of simplified, durable, and inexpensive reversing mechanism which insures a positive and quick reverse and requires but a limited movement of the parts to effect the desired change of motion.

The above-mentioned and other desirable objects are attained by the construction, combinations, and arrangements of parts, as disclosed on the drawings, set forth in this specification, and succinctly pointed out in the appended claims.

With reference to the drawings filed herewith and bearing like reference characters for corresponding parts throughout, Figure 1 is a view in end elevation of my improved reversing mechanism shown with a portion of the frame and driven wheel broken away, and Fig. 2 is a view of its mechanism in the side elevation looking from the right of Fig. 1.

This invention includes a driving-wheel, as 10, an adjustably-mounted reversing-wheel 11, operatively connected with the driving-wheel, an adjustably-mounted driven wheel 12, and means to simultaneously adjust said driving-wheel and the reversing-wheel relatively to the driven wheel. As now considered the driven member consists of a friction-wheel formed with annular grooves in the periphery, and the driving and reversing wheels consequently consist of corresponding friction-wheels. This driven wheel is supported in a suitable frame, as 14, of any desired construction, and is rotatably mounted on an adjustable bearing consisting of an eccentric shaft 15, formed with eccentrically-disposed bearing parts at suitable points, which are rotatably seated in journal-boxes 16 or the like, arranged on frame 14, and a lever-socket, as 17, is secured to this shaft at a suitable point for the application of a lever to partly rotate the shaft to adjust the driven wheel.

At one side of wheel 12 is the driving-wheel 10, which is fixedly mounted on a rotatable driving-shaft 18, arranged parallel with the adjustable bearing 15 and rotatably supported in suitable stationary journal-boxes, as 19, arranged on frame 14 at suitable points to support said shaft 18, with the periphery of the driving-wheel in close proximity to the periphery of the driven wheel, so that it requires but a comparatively slight adjustment of the latter to throw it in or out of mesh relatively to the former. This driving-shaft 18 is driven continuously in one direction by any suitable means—as, for example, through the medium of a gear 20, fixedly mounted thereon and meshing with a power-gear. (Not shown.)

Closely adjacent the driving-wheel is the reversing-wheel 11, which is secured to a reversing-shaft 21, arranged parallel to driving-shaft 18 and rotatably mounted in suitable bearings 22, arranged on a carrier, as 23, which is pivotally supported on said driving-shaft for adjustment so that the reversing-wheel can be conveniently engaged or disengaged relatively to the periphery of driven wheel 12 by swinging said carrier. This reversing-wheel stands clear of the driving-wheel, and the shaft of the latter is operatively connected with the shaft of the former by a pair of spur-gears 24, which are secured to said shafts in mesh with each other and serve as means to drive the shaft of the reversing-wheel from the driving-shaft and in an opposite direction relatively thereto. The reversing-wheel 11 is conveniently adjusted simultaneously with the adjustments of the driven wheel 12 by means of a crank-arm 25, secured to shaft 15, and a link 26, which is pivotally connected with said arm and the carrier 23 at suitable radii relatively to the centers of movement of said parts and the throw of shaft 15 to bring the reversing-wheel into positive engagement with the driven wheel 12 following the disengagement of said driven wheel from the driving-wheel 10 as the shaft 15 is given a partial rotation in one direction and to disengage said reversing-wheel from the driven wheel as said shaft is reversely rotated to bring the driven wheel into engagement with the driving-wheel. In the present embodiment the carrier 23 is formed substantially U-shaped and provided with bosses 23' at the free ends of the stem portions, having corresponding apertures of suitable size to receive driving-shaft 18, and the bearings 22 for shaft 21 are arranged on these stem portions adjacent their opposite ends. This carrier is formed of suitable size to embrace freely the reversing and driving wheels and also the spur-gears 24, and the link 26 is connected with said carrier, above the center of movement thereof, adjacent the shaft of the reversing-wheel, while the opposite end of the link is connected with crank-arm 25 below the center of eccentric shaft 15, so that the carrier will be swung inwardly toward the driven wheel to apply the reversing-wheel as the eccentric shaft is turned to disengage the driven wheel from the driving-wheel and the carrier will be swung outwardly from the driven wheel to disengage the reversing-wheel as the eccentric shaft is turned to carry the driven wheel into engagement with the driving-wheel.

By movably mounting both the driven wheel and reversing-wheel it requires but a slight adjustment of these wheels to reverse the movement of the driven wheel, and consequently the mechanism can be quickly adjusted to drive the driven wheel in the required directions. Where the reversing mechanism is employed to operate a rope-drum or the like, the drum is rotatably mounted on shaft 15 and connected with driven wheel 12, so that it will rotate therewith.

This reversing mechanism is simple of construction and operation, acts in a most positive and reliable manner, and requires but slight adjustment to reverse the same, while the parts can be compactly arranged and are not likely to get out of order.

Having thus described my invention, what I claim as new, and desire to secure by Letters Patent, is—

1. In a reversing mechanism; the combination of a driving-wheel, a driven wheel adjustably mounted relatively to said driving-wheel, and a reversing-wheel adjustably mounted relatively to said driven wheel and operatively connected with said driving-wheel.

2. In a reversing mechanism; the combination of a driving-wheel, a driven wheel adjustably mounted relatively to said driving-wheel, and a reversing-wheel adjustably mounted relatively to said driven wheel and operatively connected with said driving-wheel and adapted to be moved into engagement with said driven wheel as the driven wheel disengages from the driving-wheel.

3. In a reversing mechanism; the combination of a driving-wheel, a driven wheel adjustably mounted relatively to said driving-wheel, a reversing-wheel adjustably mounted relatively to said driven wheel, and operatively connected with said driving-wheel and means to adjust said driven wheel and reversing-wheel simultaneously.

4. In a reversing mechanism; the combination of a driving-wheel, a driven wheel adjustably mounted relatively to said driving-wheel, a reversing-wheel adjustably mounted relatively to said driven wheel and operatively connected with said driving-wheel but not meshing therewith, and means to adjust said driven wheel and reversing-wheel simultaneously.

5. In a reversing mechanism; the combination of a frame, a driving-wheel, an eccentric shaft mounted in said frame, a driven wheel rotatably mounted on said shaft for adjustment relatively to said driving-wheel, a reversing-wheel adjustably mounted relatively to said driven wheel and operatively connected with said driving-wheel and adjustably connected with said shaft.

6. In a reversing mechanism; the combination of a frame, a driving-wheel, an eccentric shaft mounted in said frame, a driven wheel rotatably mounted on said shaft for adjustment relatively to said driving-wheel, a pivotally-mounted carrier operatively connected with said shaft, and a reversing-wheel mounted in said carrier for adjustment relatively to said driven wheel.

7. In a reversing mechanism; the combination of a frame, a driving-wheel, an eccentric shaft mounted in said frame, a driven wheel rotatably mounted on said shaft for adjustment relatively to said driving-wheel, a carrier pivotally mounted concentric with said driving-wheel and operatively connected with said shaft for adjustment relatively to said driven wheel, and a reversing-wheel mounted on said carrier and operatively connected with said driving-wheel.

8. In a reversing mechanism; the combination of a frame, a driving-wheel, an eccentric shaft mounted in said frame, a driven wheel rotatably mounted on said shaft for adjustment relatively to said driving-wheel, a carrier pivotally mounted concentric with said driving-wheel and operatively connected with said shaft for adjustment relatively of said driven wheel, a reversing-wheel mounted on said carrier, and means operatively connecting said driving-wheel with the reversing-wheel.

9. In a reversing mechanism; the combination of a frame, a driving-shaft, a driving-wheel secured to said shaft, an eccentric shaft mounted in said frame, a driven wheel rotatably mounted on said shaft for adjustment relatively to said driving-wheel, a carrier, pivotally mounted concentric with said driving-wheel for adjustment relatively to said driven wheel, a reversing-shaft mounted on said carrier, a reversing-wheel secured to last said shaft, spur-gears secured to the shafts of the driving and reversing wheels and meshing with each other, a crank-arm secured to said eccentric shaft, and a link connected with said arm and with said carrier.

10. In a reversing mechanism; the combination of a frame, a driving-shaft, the grooved driving-wheel 10 secured to said shaft, the eccentric shaft 15 mounted in said frames, the grooved driven wheel 12 rotatably mounted on said shaft, the carrier 23 pivotally mounted on said driving-shaft, the reversing-shaft 21 rotatably mounted in said carrier, the grooved reversing-wheel 11 secured to last said shaft, the gears 24 secured to said reversing-shaft and driving-shaft, the crank-arm 25 secured to the eccentric shaft, and the link 26 connected with said arm and carrier.

11. In a reversing mechanism; the combination of a driving-wheel, a driven wheel adjustably mounted for engagement of its periphery with the periphery of said driving-wheel, and a reversing-wheel adjustably mounted for engagement of its periphery with the periphery of said driven wheel and operatively connected with said driving-wheel.

Signed at Seattle, Washington, this 4th day of June, 1903.

ERIC JOHNSON.

Witnesses:
 WINFIELD R. SMITH,
 MABEL V. McGILL.